March 11, 1969 EIICHI GOTO 3,432,680

PARAMETRON LOGICAL COMPUTER DEVICE

Filed Dec. 20, 1963 Sheet 1 of 5

INVENTOR.
Eiichi Goto
BY Robert E. Burns,
Attorney

INVENTOR.
Eiichi Goto
BY Robert E. Burns,
Attorney

INVENTOR.
Eiichi Goto
BY Robert E. Burns
Attorney

INVENTOR.
Eiichi Goto,
BY Robert E. Burns
Attorney

INVENTOR.
Eiichi Goto,
BY Robert E. Burns,
Attorney

United States Patent Office 3,432,680
Patented Mar. 11, 1969

3,432,680
PARAMETRON LOGICAL COMPUTER DEVICE
Eiichi Goto, Meguro-ku, Tokyo-to, Japan, assignor to Zaidan Hojin Parametron Kenkyusho (known as Parametron Institute), Tokyo-to, Japan
Filed Dec. 20, 1963, Ser. No. 332,130
Claims priority, application Japan, Dec. 31, 1962, 37/60,098; May 21, 1963, 38/25,445
U.S. Cl. 307—88 16 Claims
Int. Cl. H01f *27/26*

ABSTRACT OF THE DISCLOSURE

Transformer-like parametron coupling device with input and output circuits electromagnetically coupled to each other and a third circuit coupled to both the input and output circuits for applying an exciting current. Stacked boards defining a closed magnetic path achieve electromagnetic coupling of the circuits.

This invention relates to logical computer devices and more particularly to a logical computer device which comprises printed circuit boards for coupling logical circuit elements which can be assembled very easily.

As is well known in the art, parametrons (i.e., phased locked ½ subharmonic oscillators) have many advantages when they are utilized as logical computer elements. However, whether parametrons are advantageous or not when compared with other types of elements is mainly determined not only by the single element tiself but also by the ease of combining a plurality of logical elements to fabricate a complete logical computer device.

According to the conventional method of assembling parametrons into a logical computer, electric conductors are linked through toroidal magentic cores to provide logical coupling between them, but the step of inserting conductors through toroidal magnetic cores is very difficult in practice to accomplish automatically in large quantities.

Moreover, it is often required to use a method of assembling wherein changeable or renewable circuit elements each comprising a single parametron element or a few parametron elements are utilized from the standpoint of actual use. In such a case, it has been the practice to utilize a method of assembling wherein sockets, connectors and printed boards are used, which is essentially the same as the method of assembling logical computer devices utilizing other types of logical elements such as transistors and the like. In other words, the prior method of assembling parametron logical computer devices has no particular merit over the method of assembling logical computer devices utilizing other types of elements.

Accordingly, it is the principal object of this invention to provide a novel parametron logical computer device which can be assembled by mass production techniques.

It is another object of this invention to provide a parametron computer device utilizing assembled transformers.

A further object of this invention is to provide a novel parametron computer device whose component parts can be easily replaced, if desired.

Generally speaking, this invention relates to improvements of a parametron logical computer device of the type wherein a magnetic flux having the parametron oscillation frequency is created in a magnetic circuit by the oscillation output of a parametron, and an electrical circuit passing through a plurality of said magnetic circuits is provided to mutually couple the logical circuits of said parametron.

In one embodiment of this invention a plurality of circuit boards, each having perforations to receive magnetic circuit components and adapted to couple the logical circuits, are assembled and the respective magnetic circuit components are inserted to penetrate through each of said circuit boards so as to couple together said magnetic circuit components and the electric circuit of said circuit boards to form transformers. In a modification, each of the said magnetic circuit components is constructed as a non-linear magnetic circuit and electric oscillation and exciting electric circuits are coupled therewith to form a parametron oscillator device. The magnetic circuit component preferably comprises a rod having a coating of a magnetic material. Magnetic short-circuiting plates are provided on the printed circuit boards adapted to support the magnetic circuit components to form a closed magnetic path together with said coating of magnetic material.

Further objects and advantages of the present invention fill become apparent and this invention will be better understood from the following description, reference being made to the accompanying drawings. The features of novelty which characterize the invention are set forth in the claims annexed to and forming a part of this specification.

In the drawings, the same or equivalent members are designated by like reference characters, and in which.

Figure 1:
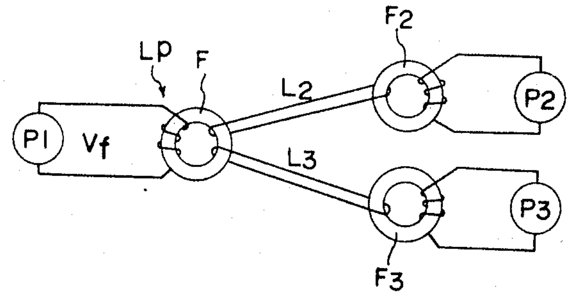
FIG. 1 is a diagram illustrating one example of the method of combining a plurality of parametrons.

Referring now to the accompanying drawings, the principle of this invention will first be described by referring to FIGS. 1 and 2. FIG. 1 illustrates one method of coupling together a plurality of parametrons. More particularly, in order to couple the output of one parametron P1 to two other parametrons P2 and P3, the output voltage $V_f$ having a frequency *f* of the first parametron is supplied to a primary winding of a transformer F having a toroidal high frequency magnetic core. Two secondary windings of the transformer F are respectively coupled with the parametrons P2 and P3 through loop conductors L2, L3 and similar transformer F2 and F3.

In applying the method of coupling parametrons as shown in FIG. 1 to mass production of logical computer devices including a number of parametron elements, there are difficulties as follows. This method of coupling requires many steps of inserting conductors through the toroidal cores of the transformer, but such steps of conductor insertion are difficult to be carried out by automatic machines.

Figure 2A:
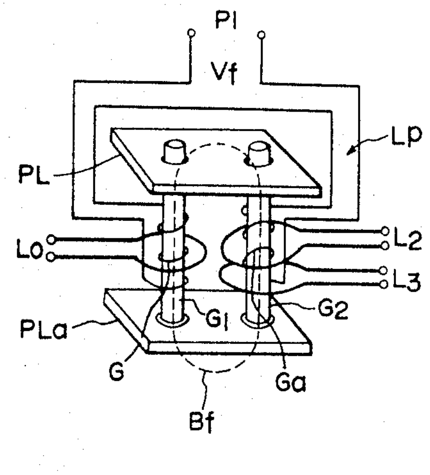
FIG. 2A is a diagram, partly in perspective, to explain the principle of this invention.

Such difficulty can be obviated by employing transformers of the assembled type. FIG. 2A illustrates one example of such type wherein the members designated by reference characters L2 and L3 are identical with those designated by the reference characters L2 and L3 shown in FIG. 1. In this case, however, the conductive coupling coils L2 and L3 are prepared beforehand, and the magnetic circuit of the transformer F is assembled afterward. Parts shown in FIG. 2A corresponding to the transformer F of FIG. 1 are two serially connected elongated coils G and $G_a$ in the form of solenoids which are supported between a pair of plates PL and $PL_a$, said coils having magnetic cores $G_1$ and $G_2$, respectively. As in the case shown in FIG. 1, the output voltage $V_f$ of the parametron P1 is impressed across said serially connected coils G and $G_a$. Since there is no appreciable difference between the input and output terminals of a parametron element, the input to the parametron P1 may be supplied through the transformer F. For this purpose, the input may be supplied across a coil $L_o$ It is to be understood that the transformer F shown in FIG. 2A should satisfy the following conditions.

(1) It should have a construction that can be assembled afterward.

(2) It should have adequate space enough to accommodate the maximum number N of the input and output coils $L_0$, $L_1$, $L_3$ and so forth.

(3) Leakage of the magnetic flux $B_f$ of the oscillation frequency $f$ of the parametron should be as small as possible. This is particularly important to decrease mutual interference between parametrons in the case where it is desired to increase the number of parametrons per unit volume or area.

Supplementing the description regarding the condition 3, it means that the magnetic path of the flux $B_f$ should be closed. For providing a closed magnetic path, generally there are employed two methods, namely, to include in the magnetic path a substance of high permeability and to wind coils so as to preclude any leakage of magnetic flux. In the transformer F shown in FIG. 2A, the latter method is adopted in the magnetic circuit for the coils G and $G_a$. While the magnetic circuit can be nearly closed even when coils G and $G_a$ of the air core type are used, it is more advantageous to place a material of high permeability in coils G and $G_a$, It is also possible to use supporting plates PL and $PL_a$ in the form of magnetic short-circuiting plates made of a high permeability material, such as dust core, ferrite, and the like, so as to cause them to magnetically couple with the coils G and $G_a$, thereby providing a closed magnetic core of higher efficiency. However, the result of our experiments has shown that it is not always necessary to use magnetic short-circuiting plates in the case where the device is to be operated as a parametron logical computer.

The feature of the parametron coupling method utilizing transformers of the above described assembled type will become apparent by referring to FIG. 3.

Figure 3A:
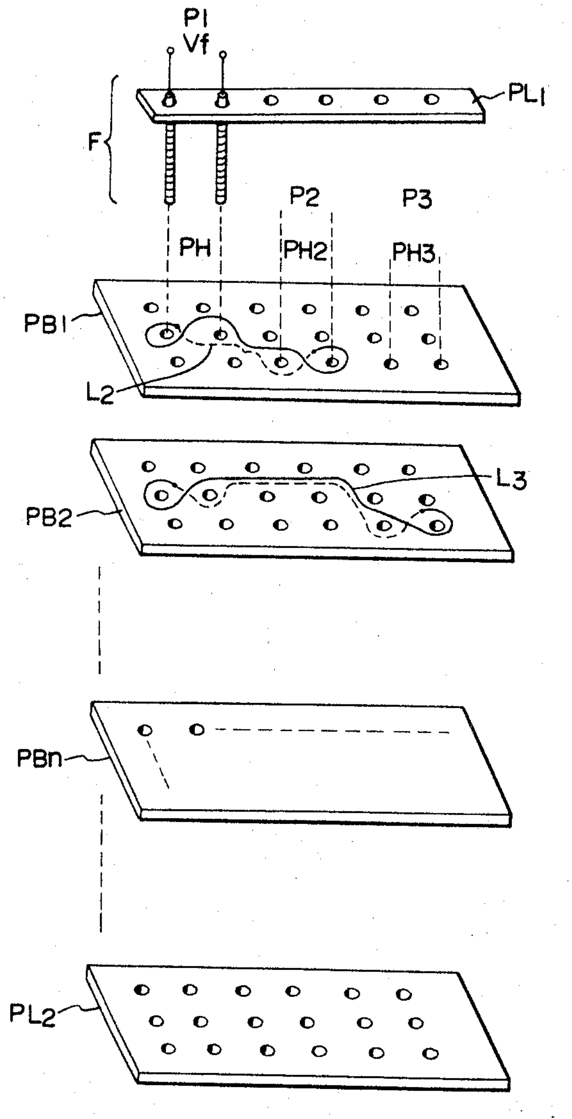
FIG. 3A shows an enlarged view illustrating a method of coupling parametrons utilizing assembled type transformers.

In FIG. 3A, reference characters F, $V_f$, P1, PL1, PL2, P2, P3, L2 and L3 designate identical parts in FIGS. 1 and 2A, and PB1, PB2 and PB*n* indicate electric circuit boards for coupling logical circuits, such as printed circuit boards, the full and dotted lines representing the printed circuits on the front and reverse sides, respectively. It will be seen that the coupling conductor coils L2 and L3 shown in FIG. 1 are provided as printed circuits on the boards PB1 and PB2, respectively. The transformer F connectable to the parametron P1 is to be inserted into two perforations indicated by PH. Similarly, transformers (not shown) similar to the transformer F shown in FIG. 2A are respectively connected to the parametrons P2 and P3 and are inserted into perforations PH2 and PH3.

Figure 3B:
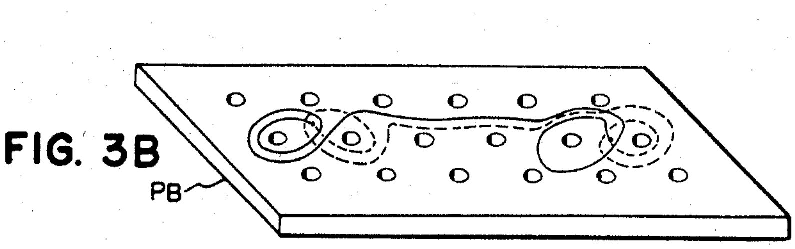
FIG. 3B is a perspective view of a printed circuit board for coupling logical circuits, which is provided with coupling conductors having multiple turns.

Although in FIG. 3A all the coupling conductors printed on the electric circuit boards for coupling logical circuits are shown, respectively, as a single turn, when the coupling with the solenoid coils inserted into the perforations are relatively weak, denser coupling can be provided by utilizing coupling conductors each of which has two or more turns as shown in FIG. 3B. As can be easily noted from the drawing, even with coupling conductors having many turns, only two perforations are required for one set of coils G and $G_a$ regardless of the number of turns, whereby the preparation of these circuit boards is facilitated.

Figure 3C:
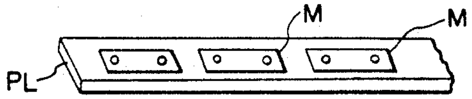
FIGS. 3C and 3D illustrate two forms of magnetic short-circuiting plates on the transformer supporting plate shown in FIG. 2.
Figure 3D:
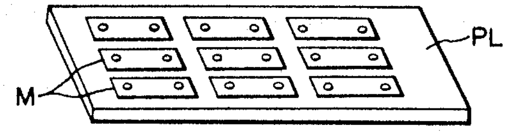

When supporting plates PL and $PL_a$ in the form of magnetic short-circuiting plates as shown in FIG. 2A are to be used, as shown in FIG. 3C and FIG. 3D, magnetic short-circuiting plates M are provided on the supporting plates $PL_1$ and $PL_2$ of FIG. 3 around the perforations thereof into which solenoid coils G and $G_a$ are to be inserted.

Figure 2B:
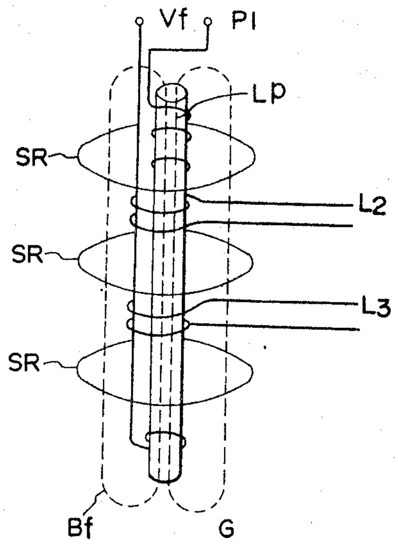
FIG. 2B is a diagram showing a modification of the arrangement in FIG. 2, which can prevent mutual interference between adjacent transformers.

The transformer may comprise a single rod-shaped magnetic member instead of two. In this case, it is preferable to use a short-circuiting ring SR for each electric circuit, as shown in FIG. 2B in order to prevent mutual interference between adjacent transformers. These short-circuiting rings SR function to prevent the oscillation magnetic flux $B_f$ of the parametron from leaking to the outside thereof, thus preventing mutual interference between adjacent transformers.

Figure 3E:
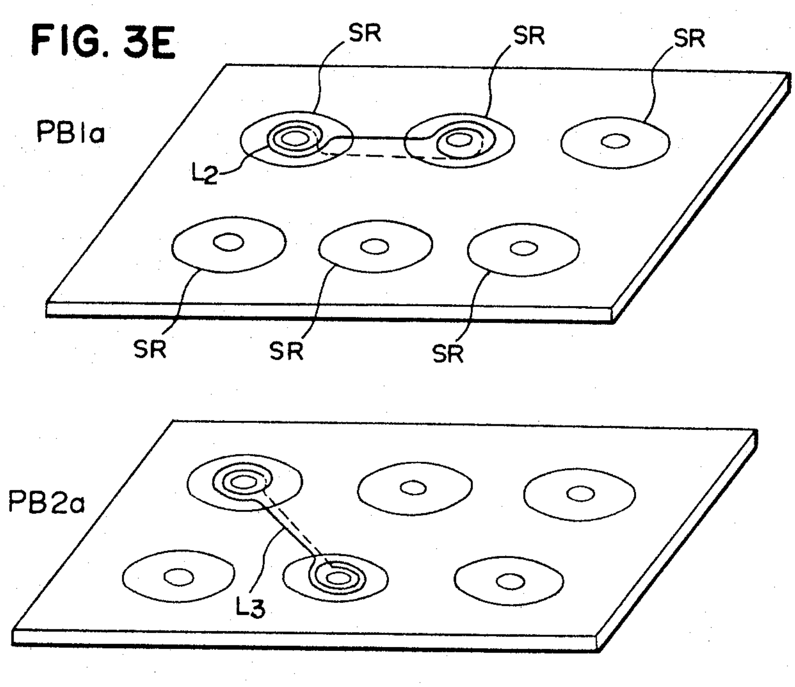
FIG. 3E illustrates two forms of the printed circuit boards suitable for use with the modification shown in FIG. 2.

In order to provide a wiring according to this method by means of printed circuit boards, it is advantageous to use printed circuit boards as shown in FIG. 3E.

It will be clear that, by the method of fabrication shown in FIG. 3, all of the logical wirings for the parametron circuits can be constructed as printed circuits.

Figure 4:
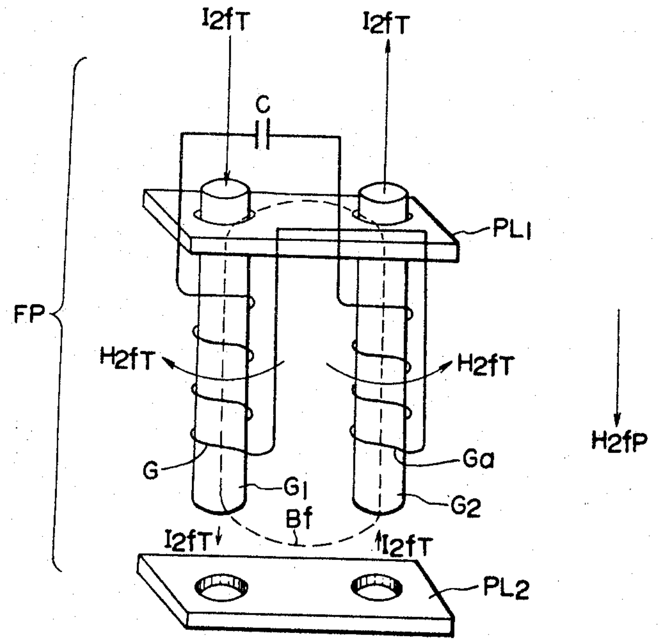
FIG. 4 is an exploded view of a common transformer type rod-shaped parametron.

Although in the above described embodiments parametrons are connected to elongated transformers F, the magnetic circuit of the transformer F shown in FIG. 2 and having a frequency $f$ (the oscillation frequency of the parametron) can also be used as the oscillation magnetic circuits of the magnetic type parametrons. It is advantageous to construct the oscillation magnetic circuit of the parametron as a closed magnetic circuit for the same reason as that described in connection with the transformer F and also in order to improve the buildup speed of the oscillation. FIG. 4 illustrates one example of such common use.

The common transformer type rod-shaped parametron shown in FIG. 4 has substantially the same construction as the rod-shaped transformer shown in FIG. 2 wherein $PL_1$ and $PL_2$ designate similar supporting plates or magnetic short-circuiting plates for the core $G_1$ and $G_2$. Nonlinear magnetic cores for a parametron oscillator are used as the cores $G_1$ and $G_2$. These cores may be made of ferrite, but a cylindrical material such as metal or glass having a permalloy magnetic film on its surface is especially suitable. A tuning capacitor C of a parametron oscillator is added to coils wound about the core $G_1$ and $G_2$. In order to excite the parametron, an oscillator of either of two types can be used, namely, that of the T (transverse) mode wherein the oscillation magnetic flux $B_f$ is perpendicular to the exciting magnetic field $H_{2f}$ and that of the P (parallel) mode wherein $B_f$ and $H_{2f}$ are parallel. To use the T mode type, the current is passed in the direction indicated by the arrow $I_{2fT}$. Thus, in order to operate in the T mode, it is necessary to complete an electrical connection for passing the current in the direction $I_{2fT}$ after inserting the parametron FP into a printed circuit board as shown in FIG. 3. The arrow $H_{2fT}$ in FIG. 4 indicates the exciting field of the T mode.

Figure 5:
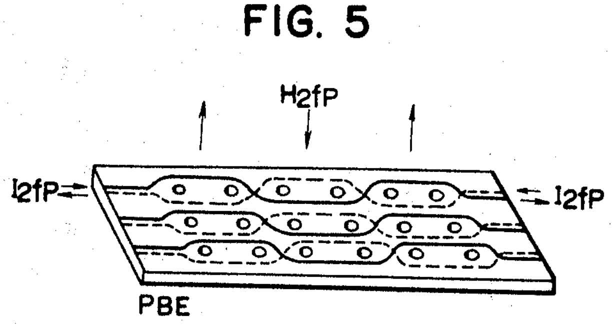
FIG. 5 shows a perspective view of a printed circuit board to be added to the assembly shown in FIG. 3 in order to make it possible to use a common transformer type rod-shaped parametron.

In order to excite the parametron FP in the P mode, a high-frequency exciting magnetic field is impressed in the direction $H_{2fP}$ in FIG. 4. In the case wherein the parametron FP is used with a printed circuit board as shown in FIG. 3, the high frequency exciting magnetic field $H_{2fP}$ can also be created by the printed circuit boards. For this purpose, any suitable number of the printed circuit boards PBE as shown in FIG. 5 is added to FIG. 3. Since coupling coils L2, L3, for parametron logical circuits are wound in balanced condition with respect to two perforations PH, the high frequency exciting field $H_{2fP}$ will not couple with these coils.

Figure 6A:
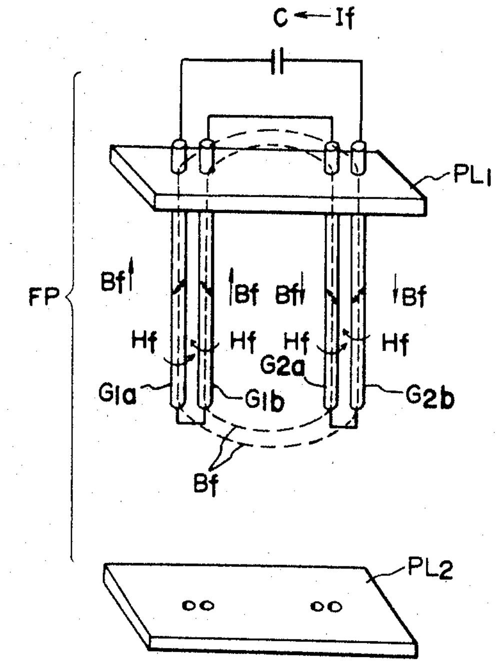
FIG. 6A is an exploded view illustrating a modification of the common transformer type rod-shaped parametron.
Figure 6B:
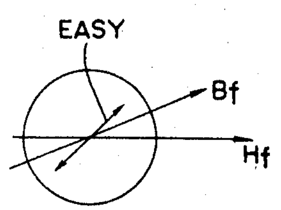
FIG. 6B is a diagram showing magnetic field and field vector; for explaining the operation of the embodiment of FIG. 6A.

FIG. 6A shows a further embodiment of the common transformer type rod-shaped parametron FP. The difference between this parametron FP and that shown in FIG. 4 is that each of the cores is sub-divided into $G_{1a}$, $G_{1b}$ and $G_{2a}$, $G_{2b}$ conductors plated with a thin magnetic material such as permalloy and the like are especially suitable for these cores. Inasmuch as the parametron oscillation current $I_f$ flows through these plated conductors, the magnetic field $H_f$ created thereby will not have an axial (longitudinal direction in the drawing) component. However, as shown in FIG. 6B, by utilizing a magnetic film having an axis of easy magnetization EASY in an appropriate direction, the magnetic flux $B_f$ can be caused to contain a longitudinal component permitting the same function as the parametron shown in FIG. 4. Since the rod-shaped parametron shown in FIG. 6A does not require any winding, it is suitable for mass production, but it is disadvantageous in that the value of C may become very large and the Q (sharpness of the resonance) too small at low frequencies.

It should be understood that, while in the above description separate supporting plates $PL_1$ and $PL_2$ for the coils G and $G_a$ and the printed circuit board PB have been used, they may be combined into a unitary structure.

Figure 7:
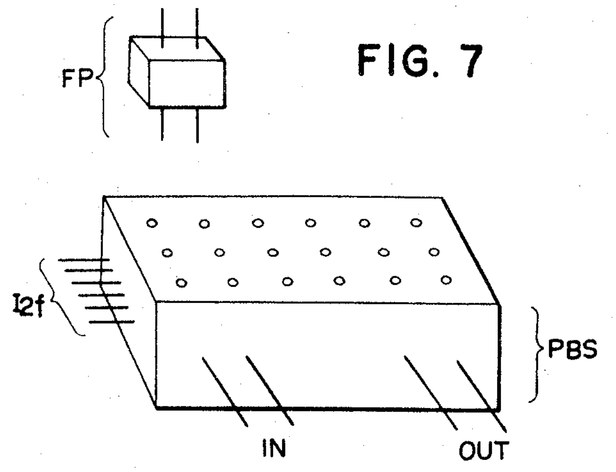
FIG. 7 shows a perspective view of a logical coupling circuit group comprising an assemblage of the logical circuits.

From the description presented hereinabove, it will be clearly noted that the parametron device embodying the principle of this invention has the following features:

(1) Since all of the logical wirings are made solely by means of printed circuits, they can be manufactured by mass production techniques and have high reliability. Logical coupling circuit group comprising an assemblage of the logical circuits have a configuration PBS shown in FIG. 7, wherein $I_{2f}$ indicates exciting terminals, and, if required, input terminals IN and output terminals OUT may be led out from the printed circuit boards.

(2) All of the parametrons (non-linear parts, for example, rod-shaped ferrite, plated conductor and the like) acting as the active elements can be changed very easily. This is quite important from the viewpoints of both production and maintainance. A common rod-shaped transformer type parametron FP has an appearance as shown in the upper portion of FIG. 7 and is provided with output terminals T for the oscillation which can be also utilized as the input or output terminals for testing or adjustment. It is particularly to be noted that no electrical connection is required for mounting and removing parametrons operating in the P mode.

While the invention has been disclosed by describing particular embodiments thereof, it will be apparent that improvements and modifications may be made therein without departing from the scope of the invention as defined in the appended claims.

What I claim is:

1. In a parametron logical computer device of the type wherein a magnetic flux having the parametron oscillation frequency is created in a magnetic circuit by the oscillation output of a parametron, and an electrical circuit passing through a plurality of said magnetic circuits is provided to mutually couple the logical circuits of said parametron, a combination comprising an assemblage of a plurality of circuit boards for coupling said logical circuits, each of said circuit boards being provided with perforations adapted to receive magnetic circuit components, and means to insert each electric circuit component through each of said circuit boards so as to couple together said magnetic circuit component and the electric circuit of said circuit board to form a transformer.

2. The parametron logical computer device according to claim 1 wherein magnetic short circuiting plates are provided on the upper and lower surfaces of said plurality of electric circuit boards, and said magnetic circuit component is provided with a magnetic film which cooperates with said magnetic short-circuiting plates to form a closed magnetic circuit.

3. The parametron logical computer device according to claim 1 wherein said electric circuit board comprises a printed circuit board.

4. The parametron logical computer device according to claim 1 wherein a group of logical coupling circuits having exciting terminals, input terminals and output terminals, all of said terminals being led out from the respective electric circuit boards, is capable of being connected to and disconnected from a common transformer type to parametron element provided with rod-shaped non-linear magnetic legs.

5. The parametron logical computer device according to claim 4 wherein each of said electric circuit boards is provided with a short-circuiting ring adapted to prevent mutual interference between transformers.

6. In a parametron logical computer device of the type wherein a magnetic flux having the parametron oscillation frequency is created in a closed magnetic circuit by the oscillation output of a parametron, and an electrical circuit passing through a plurality of said magnetic circuits is provided to mutually couple the logical circuits of said parametron, a combination comprising an assemblage of a plurality of circuit boards for coupling said logical circuits, each of said circuit boards being provided with perforations adapted to receive magnetic circuit components, and means to insert non-linear magnetic circuit components through each of said circuit boards so as to couple together the electric circuit of said circuit board and said non-linear magnetic circuit to form a transformer and also to couple an exciting circuit and an electrical oscillation circuit with said non-linear magnetic circuit component so as to cause it to operate also as a parametron oscillating device.

7. The parametron logical computer device according to claim 6 wherein magnetic short-circuiting plates are provided on the upper and lower surfaces of said plurality of electric circuit boards, and said magnetic circuit component is provided with a magnetic film which cooperates with said magnetic short-circuiting plates to form a closed magnetic circuit.

8. The parametron logical computer device according to claim 6 wherein said electric circuit board comprises a printed circuit board.

9. The parametron logical computer device according to claim 6 wherein a group of logical coupling circuits having exciting terminals, input terminals and output terminals, all of said terminals being led out from the respective electric circuit boards, is capable of being connected to and disconnected from a common transformer type to parametron element provided with rod-shaped non-linear magnetic legs.

10. The parametron logical computer device according to claim 9 wherein each of said electric circuit boards is provided with a short-circuiting ring adapted to prevent mutual interference between transformers.

11. Transformer-like parametron coupling device for electromagnetically coupling parametrons to form a logic circuit comprising, an input circuit corresponding to a primary winding of said transformer-like coupling device for receiving an input oscillation of frequency $f$ corresponding to an output oscillation of a parametron to be coupled to another parametron, at least one output circuit of said device electromagnetically coupled to said input circuit and corresponding to a secondary winding of said transformer-like coupling device and an input circuit for said parametron, a circuit coupled to said input and output circuits for applying in operation an exciting current of 2f to said transformer device to develop an output in said output circuit having a frequency $f$, means electromagnetically coupling said circuits comprising stacked boards defining a closed magnetic path between the respectively electromagnetically coupled circuits in operation.

12. Transformer-like parametron coupling device according to claim 11, in which said means electromagnetically coupling said circuits comprises cores in said input and output circuits extending between said boards and substantially normal thereto.

13. Transformer-like parametron coupling device according to claim 12, in which said cores comprise rods extending between said boards.

14. Transformer-like parametron coupling device according to claim 13, in which said circuits comprise turns developed about said rods.

15. Transformer-like parametron coupling device according to claim 14, in which said boards comprise openings in which said rods are received.

16. Transformer-like parametron coupling device according to claim 11, in which said means electromagnetically coupling said circuits comprise circuit boards on which said circuits are disposed, said circuit boards being disposed in a stacked condition.

References Cited

UNITED STATES PATENTS 3,087,096 4/1963 Jorgensen ____________ 307—88

BERNARD KONICK, *Primary Examiner.*

PHILIP SPERBER, *Assistant Examiner.*